United States Patent
Chao

(10) Patent No.: US 9,084,519 B2
(45) Date of Patent: Jul. 21, 2015

(54) CLEANER AND PATH CONTROLLING METHOD THEREOF

(76) Inventor: Chi-Mou Chao, Hsinchu County (TW)

( * ) Notice: Subject to any disclaimer, the term of this patent is extended or adjusted under 35 U.S.C. 154(b) by 534 days.

(21) Appl. No.: 13/495,689

(22) Filed: Jun. 13, 2012

(65) Prior Publication Data

US 2013/0037050 A1    Feb. 14, 2013

(30) Foreign Application Priority Data

Aug. 9, 2011    (TW) ................ 100128287 A

(51) Int. Cl.
*A47L 1/02*    (2006.01)
*G05D 1/02*    (2006.01)

(52) U.S. Cl.
CPC ............... *A47L 1/02* (2013.01); *G05D 1/0212* (2013.01); *A47L 2201/04* (2013.01); *G05D 2201/0203* (2013.01); *G05D 2201/0215* (2013.01)

(58) Field of Classification Search
CPC ... A47L 1/02; A47L 2201/00; A47L 2201/04; A47L 1/05; E04G 23/002; A01K 61/003; G05D 1/0212; G05D 2201/0206; G05D 2201/0215
See application file for complete search history.

(56) References Cited

U.S. PATENT DOCUMENTS

| | | | | |
|---|---|---|---|---|
| 5,655,247 A | * | 8/1997 | Allen et al. ................ | 15/103 |
| 5,890,250 A | * | 4/1999 | Lange et al. ............... | 15/50.3 |
| 8,434,504 B2 | * | 5/2013 | Simonette et al. ........ | 134/172 |
| 8,435,359 B2 | * | 5/2013 | Chao ......................... | 134/56 R |

FOREIGN PATENT DOCUMENTS

TW    201200254    1/2012

* cited by examiner

*Primary Examiner* — Robert Scruggs
(74) *Attorney, Agent, or Firm* — Muncy, Geissler, Olds & Lowe, P.C.

(57) ABSTRACT

A cleaner includes at least one cleaning component, a pump module, a driving module and a control system. The at least one cleaning component and the plate delimit at least one space. The pump module is connected to the at least one space to pump air out of the at least a space to form a negative air pressure in the at least one space so that the cleaner is sucked on the plate. The driving module is connected to the at least a cleaning component to drive the at least a cleaning component. The control system is coupled to the pump module and the driving module and controls the driving module to cause the at least one driven cleaning component to make a movement on the plate.

14 Claims, 9 Drawing Sheets

CLEANER AND PATH CONTROLLING METHOD THEREOF

BACKGROUND OF THE INVENTION

1. Field of the Invention

The invention relates to a cleaner, particularly to a cleaner for cleaning a plate.

2. Description of the Related Art

Traditionally, household windows are cleaned by opening or dismounting the windows while the windows of a multi-story building are cleaned by installing a suspension machine outside the multi-story building, controlling the suspension machine to move up and down by a motor, and cleaning the exterior of the windows of the multi-story building with a brush or a spout of water. However, the suspension machine is apt to swing due to its center of gravity being unstable when a wind blows. Cleaning workers may slip when they unduly brush the window and cleaning tools may drop and hurt pedestrians. In order to prevent the above accidents, the windows are only slightly sprayed with water and thus the windows are not completely cleaned.

SUMMARY OF THE INVENTION

An object of one embodiment of the invention is to provide a cleaner for cleaning a plate. An object of one embodiment of the invention is to provide a cleaner for cleaning an erect plate. An object of one embodiment of the invention is to provide a cleaner sucked on a plate by a negative air pressure between the cleaner and the plate and moving on the plate.

According to one embodiment of the invention, a cleaner for cleaning particles on a plate is provided. The cleaner comprises at least one cleaning component, a pump module, a driving module and a control system. The at least one cleaning component and the plate delimit at least one space. The pump module is connected to the at least one space to pump air out of the at least a space to form a negative air pressure in the at least one space so that the cleaner is sucked on the plate. The driving module is connected to the at least a cleaning component to drive the at least a cleaning component. The control system is coupled to the pump module and the driving module and controls the driving module to cause the at least one driven cleaning component to make a movement on the plate.

According to one embodiment, the at least one space comprises a first space and a second space. The at least a cleaning component comprises a first cleaning component and a second cleaning component. The first cleaning component and the plate delimit the first space. The second cleaning component and the plate delimit the second space. The pump module is connected to the first space and the second space to form a first negative air pressure in the first space and a second negative air pressure in the second space. The driving module comprises a link arm connected between the first cleaning component and the second cleaning component. The driving module causes at least one of the first cleaning component and the second cleaning component to rotate.

According to one embodiment, in a first period of time, the driving module causes the second cleaning component to rotate along a first rotation direction to generate a first torque between the second cleaning component and the link arm so that the link arm swings toward a second rotation direction opposite to the first rotation direction by the first torque. The driving module causes the first cleaning component substantially not to rotate and exerts a second torque between the first cleaning component and the link arm so that the link arm swings toward the second rotation direction.

According to one embodiment, the pump module comprises a first vacuum pump and a second vacuum pump. The first vacuum pump is connected to the first space to form the first negative air pressure in the first space. The second vacuum pump is connected to the second space to form the second negative air pressure in the second space. The control system controls the first vacuum pump and the second vacuum pump to cause the first negative air pressure to be greater than the second negative air pressure.

According to one embodiment, the pump module comprises a first air valve, a second air valve and a vacuum pump. The vacuum pump is connected to the first space via the first air valve and to the second space via the second air valve. The control system controls the first air valve and the second air valve to cause the first negative air pressure to be greater than the second negative air pressure.

According to one embodiment, in a second period of time, the driving module causes the first cleaning component to rotate along the second rotation direction to generate a third torque between the first cleaning component and the link arm. The driving module causes the second cleaning component substantially not to rotate and exerts a fourth torque between the second cleaning component and the link arm so that the link arm swings toward the first rotation direction by the third torque and the fourth torque.

According to one embodiment, the driving module further comprises a first driving device and a second driving device. The first driving device is connected to the first cleaning component to cause the first cleaning component to rotate. The second driving device is connected to the second cleaning component to cause the second cleaning component to rotate.

According to one embodiment, wherein the control system comprises a level sensor for sensing a horizontal angle of the cleaner, and wherein the control system controls the driving module according to the horizontal angle.

According to one embodiment, the cleaner further comprises a machine casing and a safety lifting lug. The lifting safety lug is disposed on the machine casing and configured to be tied with a safety rope. The safety rope is used to be tied between the safety lifting lug and a fixed point.

According to one embodiment, the cleaner further comprises a machine casing and a sensor. The sensor is disposed on the machine casing and electrically connected to the control system to sense whether the cleaner is close to a foreign body or an edge of the plate.

According to one embodiment, at least one cleaning component comprises a cleaning material adapted to touch the plate and clean the plate.

According to one embodiment, the control system comprises a remote control receiver for receiving a remote control signal, and the control system controls the driving module according to the remote control signal According to one embodiment of the invention, a path controlling method of a cleaner is provided for the cleaner moving on a plate. The cleaner comprises a first cleaning component, a second cleaning component and a link arm connected to the first cleaning component and the second cleaning component. The path controlling method comprises the steps of: forming negative air pressures in a first space and a second space, wherein the first cleaning component and the plate delimit the first space, and the second cleaning component and the plate delimit the second space; and, causing the second cleaning component to rotate along a first rotation direction to generate a first torque between the second cleaning component and the link arm so that the link arm swings toward a second rotation direction opposite to the first rotation direction by the first torque.

According to one embodiment, the path controlling method further comprises the steps of: causing the first cleaning component substantially not to rotate; and, exerting a second torque between the first cleaning component and the link arm so that the link arm swings toward the second rotation direction.

According to one embodiment, the path controlling method further comprises the step of causing the negative air pressure in the first space to be greater than the negative air pressure in the second space Based on the above-mentioned descriptions, forming the negative air pressure spaces between the cleaner and the plate makes the cleaner sucked on the plate via the atmospheric pressure and then a cleaning component of the cleaner is driven to move so that the cleaner makes a movement on the plate. Therefore, the particles on the plate are able to be cleaned.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The disclosure of Taiwan patent application No. 99139028 is incorporated herein by reference in its entirety. The above-mentioned application discloses that a cleaner with a suction-type permanent magnet can automatically move on a window and simultaneously clean the exterior and interior of the window. However, when the window is too thick, more magnetic forces are necessary for the cleaner to be sucked on the window. But, the more magnetic force the larger magnets. Correspondingly, the more weight of the cleaner becomes, the more magnetic force is needed. Therefore, the Taiwan patent application No. 99139028 is not suitable for an unduly thick window. Accordingly, what is needed is a cleaner to address the above-identified problems. The invention addresses such a need.

Figure 1:
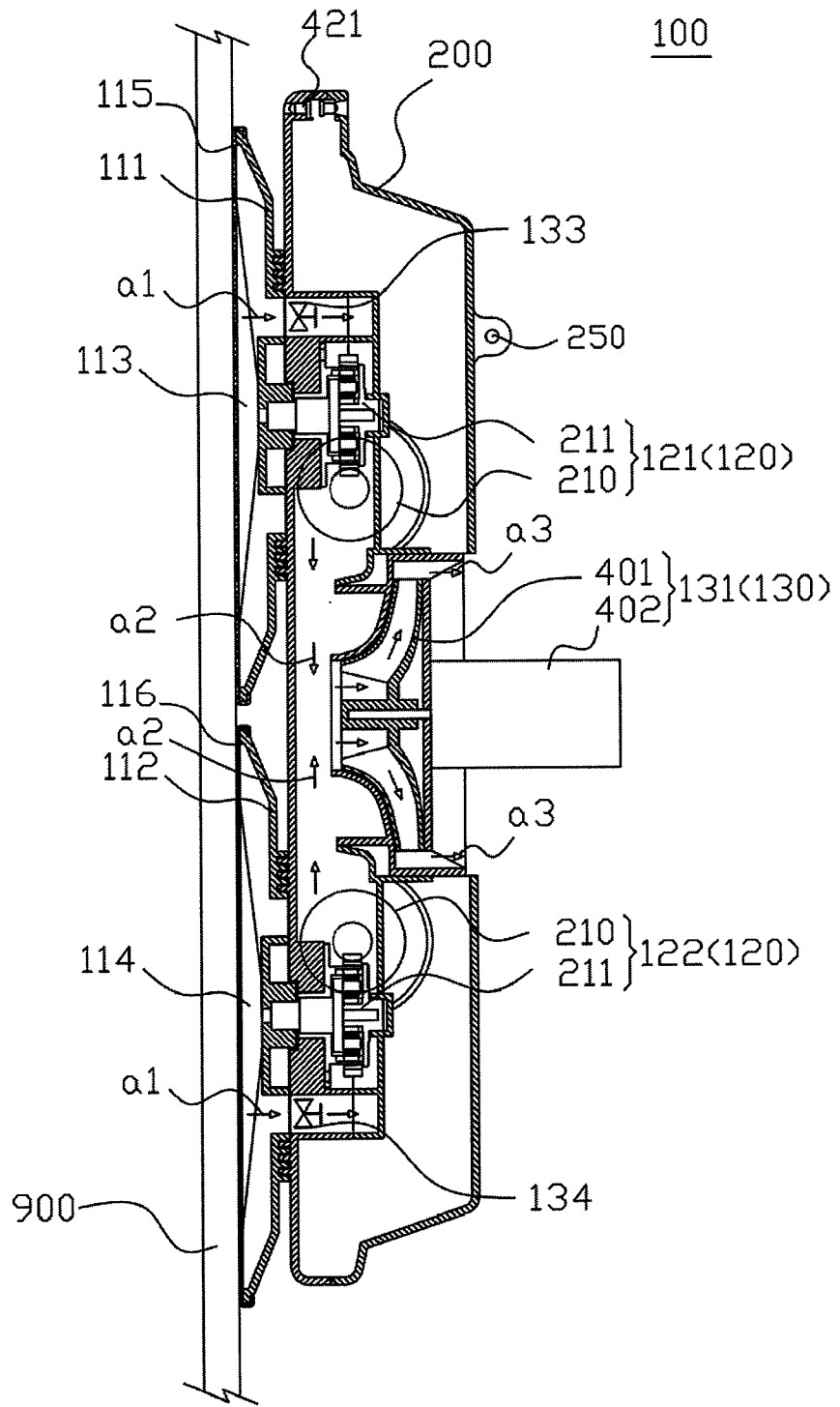
FIG. 1 is a cross-section diagram of a cleaner according to one embodiment of the invention.
Figure 2:
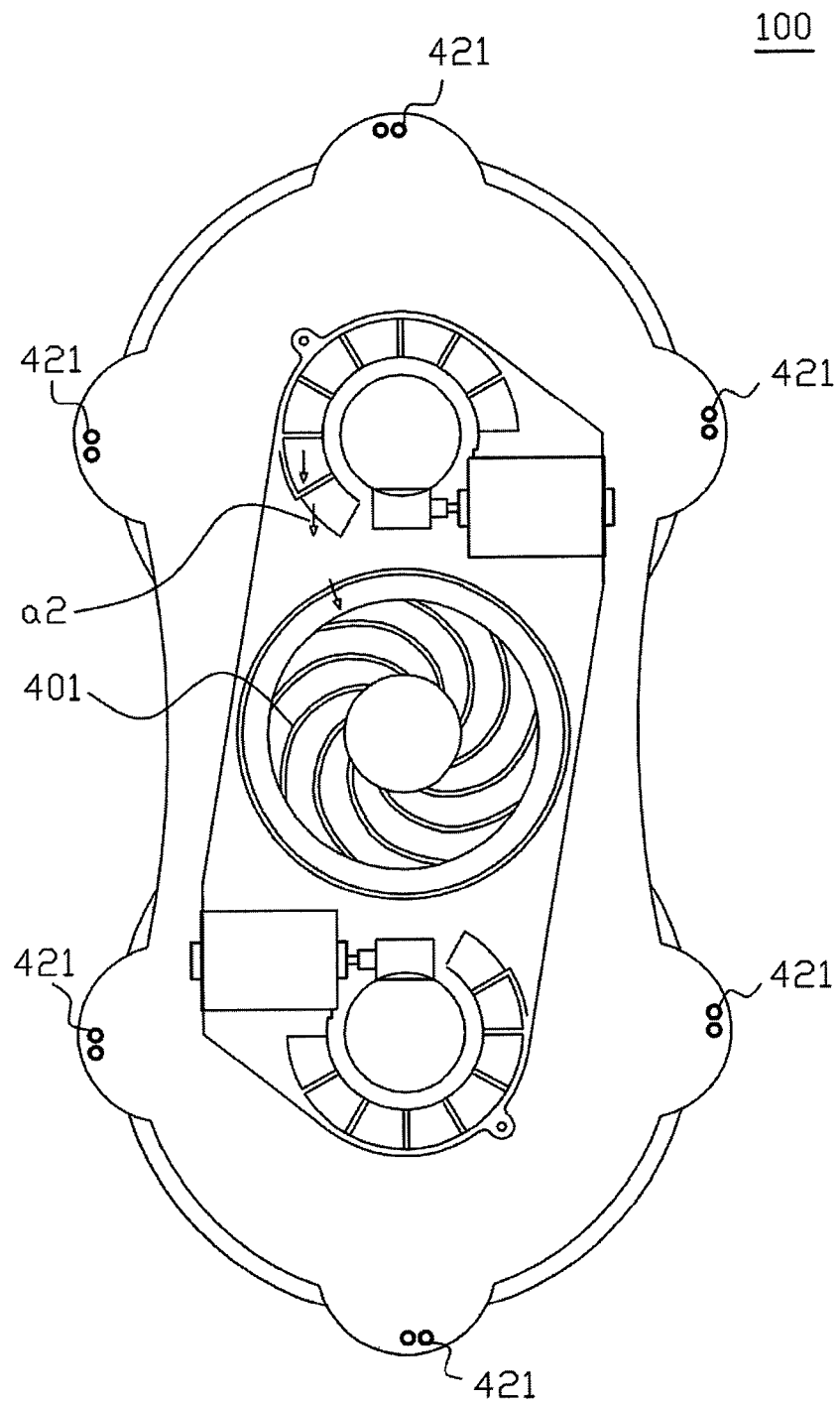
FIG. 2 is a top-view diagram of the cleaner of FIG. 1.
Figure 3:
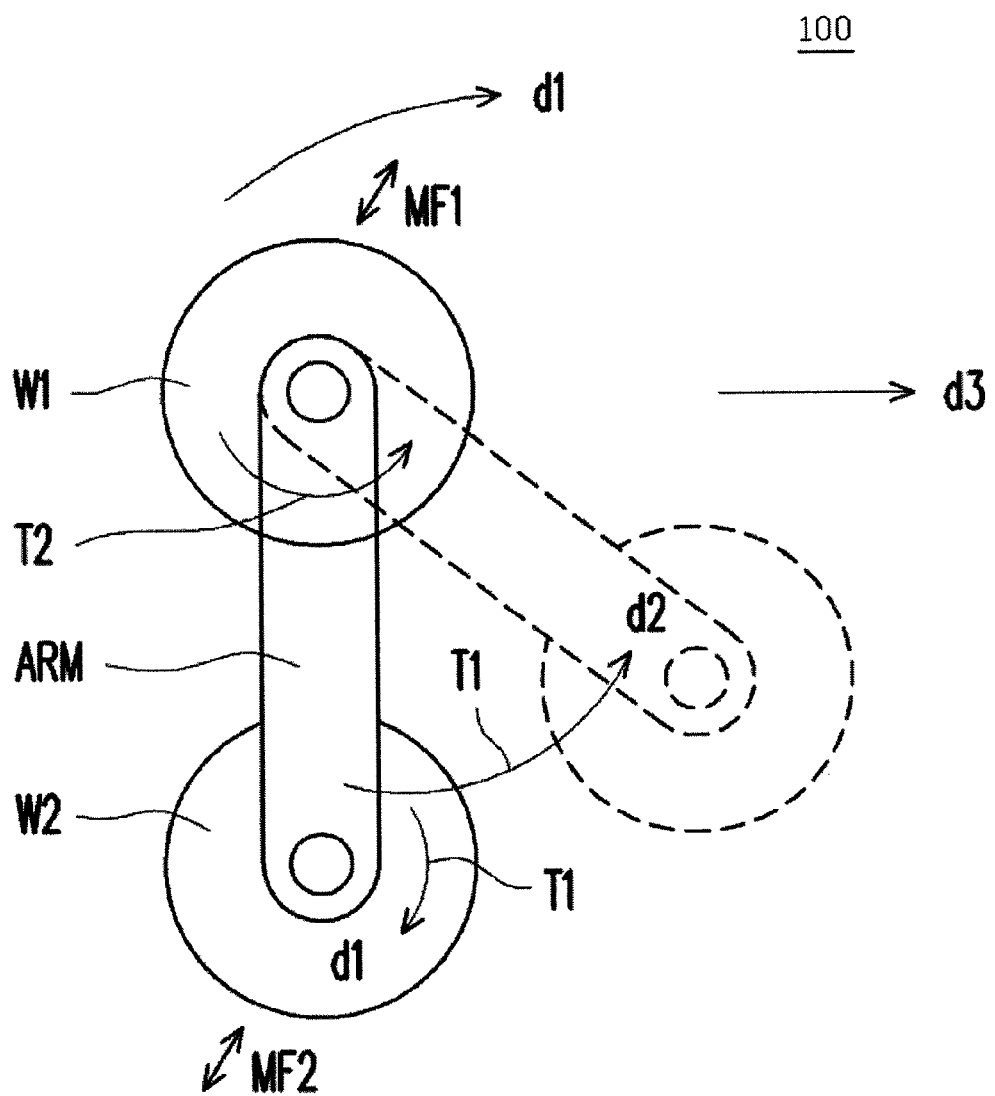
FIG. 3 is a diagram that describes a movement pattern of the cleaner of FIG. 1
Figure 6A:
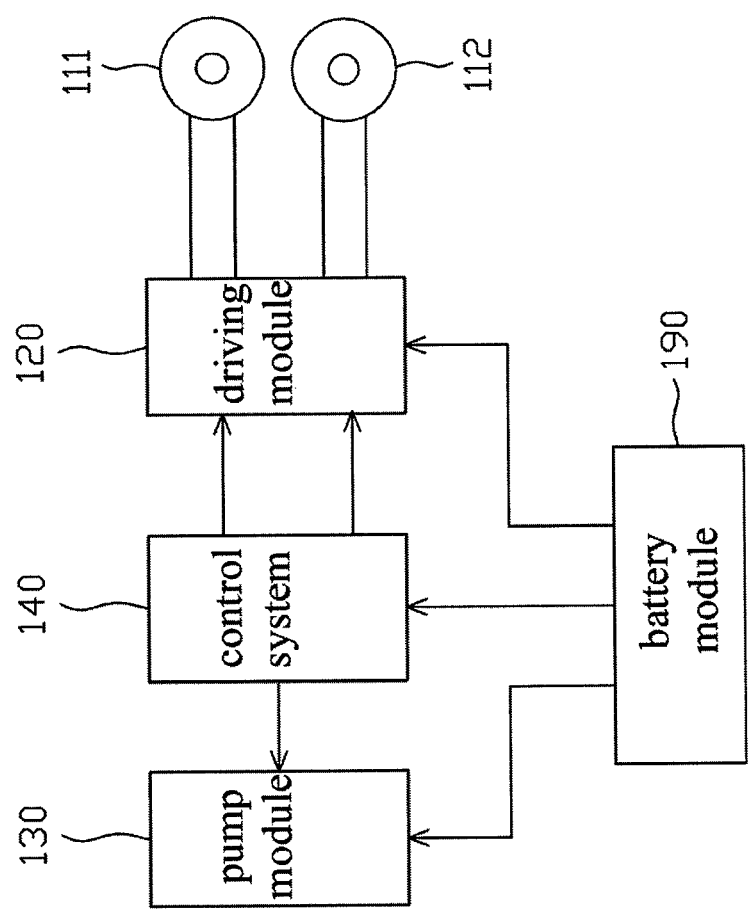
FIG. 6A is a function block diagram of a cleaner according to one embodiment of the invention.

FIG. 1 is a cross-section diagram of a cleaner according to one embodiment of the invention. FIG. 2 is a top-view diagram of the cleaner of FIG. 1. FIG. 3 is a diagram that describes a movement pattern of the cleaner of FIG. 1. As shown in FIGS. 1, 2 and 3, a cleaner 100 of the invention is adapted to attach to a plate 900 and move on the plate 900 for cleaning particles on its surface. Referring to FIG. 6A, the cleaner 100 includes two cleaning components 111 and 112, a pump module 130, a driving module and a control system 140. For example, the plate 900 may be a full-length window.

The cleaning components 111 and 112 can approximately be circular, e.g. a wheel shape, and respectfully form cleaning wheels W1 and W2 (referring to FIG. 3). The cleaning components 111 and 112 include cleaning materials 115 and 116, respectively. Example materials for the cleaning materials 115 and 116 include, without limitation, sponges, cloth or paper. The cleaning materials 115 and 116 contact the surface of the plate 900 to remove the particles on the surface. The cleaning components 111 and 112 are respectively connected to the driving module 120. Accordingly, two spaces 113 and 114 are respectively delimited by the cleaning components 111 and 112 together with the plate 900.

In one embodiment, the driving module 120 includes a link arm ARM (referring to FIG. 3). The link arm ARM is connected between the cleaning component 111 (the cleaning wheel W1) and the cleaning component 112 (the cleaning wheel W2). Specifically, one end of the link arm ARM is pivotally connected to the cleaning component 111 while the other end of the link arm ARM is pivotally connected to the cleaning component 112. In one embodiment, the driving module 120 can further include two driving units 121 and 122. The driving unit 121 is connected with the cleaning component 111 and drives the cleaning component 111 to rotate. The driving unit 122 is connected with the cleaning component 112 and drives the cleaning component 112 to rotate. In the embodiment, each of the driving units 121 and 122 includes a motor 210 and a decelerator 211. The motor 210 is used to drive the cleaning components 111 and 112 to rotate, and the decelerator 211 is used to slow down the rotation of the cleaning components 111 and 112.

In one embodiment, the pump module 130 can be a vacuum pump 131. The vacuum pump 131 connected to the space 113 and the space 114 is adapted to pump air out of the spaces 113 and 114. Referring to FIG. 1, the air in the spaces 113 and 114 is pumped into the exterior environment through paths a1, a2 and a3. In the meantime, air pressures in the space 113 and the space 114 are less than the atmospheric pressure in the exterior environment so that the negative air pressures are formed in the space 113 and the space 114. The cleaner 100 can be sucked on the plate 900 through the negative air pressures of the space 113 and the space 114. Besides, a force that the atmospheric pressure exerts on the cleaner 100 increases as the absolute value of the negative air pressure increases. In this embodiment, the vacuum pump 131 includes a motor 402 and compressor blades 401 connected to each other. The motor 402 drives the compressor blades 401 to rotate for pumping out the air.

FIG. 6A is a function block diagram of a cleaner according to one embodiment of the invention. Referring to FIG. 6A, the cleaner 100 of one embodiment further includes a battery module 190. The battery module 190 electrically connected to the pump module 130, the driving module 120 and the control system 140 serves as a power source for the pump module 130, the driving module 120 and the control system 140. The battery module 190 can further include a power sensor module (not shown). When the cleaner 100 has a power shortage, the power sensor module will raise a warning sound or a warning light. In the meanwhile, a user can take the cleaner 100 from the plate 900 after being notified of the warning. In one embodiment, the cleaner 100 can include a power line to be electrically connected to a jack. In the embodiment, the power line provides power supplies. When there is a power outage, the battery module 190 serves as a backup power source and meanwhile sends out the warning sound or the warning light. The control system 140 is coupled to the pump module 130 and the driving module 120. In response to a control signal from the control system 140, the driving module 120 drives the cleaning component 111 or the cleaning component 112 to rotate so that the rotating component 111 or the rotating component 112 makes a movement.

According to one embodiment of the invention, the operations of the cleaner 100 are described in more detail as follows. Referring to FIG. 3, when the cleaning wheel W2 is to be moved, the cleaning wheel W1 is caused substantially not to rotate and the cleaning wheel W2 is caused to rotate in a clockwise direction d1 to produce a torque T1 between the cleaning wheel W2 and the link arm ARM. Then, the torque T1 causes the link arm ARM to swing toward a rotation direction d2 opposite to the direction d1. In one embodiment, the driving device 122 of the driving module 120 further exerts a torque T2 with a rotation direction d2 between the cleaning wheel W1 and the link arm ARM.

For example, a torque T1 is exerted on the cleaning wheel W2 to force the cleaning wheel W2 to rotate. According to Newton's third law of motion (action and reaction forces), at the same time, there is a reaction force acting on the link arm ARM and the magnitude of the reaction force is equivalent to the torque T1. Therefore, the link arm ARM swings toward the direction d2 opposite to the rotation direction d1 of the cleaning wheel W2.

On the other hand, in order to increase or reduce a magnitude of a total torque Tarm of the link arm ARM, the torque T2 in the same torque direction as or the opposite torque direction to the torque exerted on the cleaning wheel W2 can be exerted on the cleaning wheel W1. In one preferred embodiment, the magnitude of the torque T2 is not enough to overcome the static friction force to make the wheel W1 rotate. Thus, the cleaning wheel W1 keeps substantially still. Meanwhile, the total torque Tarm of the link arm ARM is expressed as: Tarm=T2+T1.

Figure 6B:
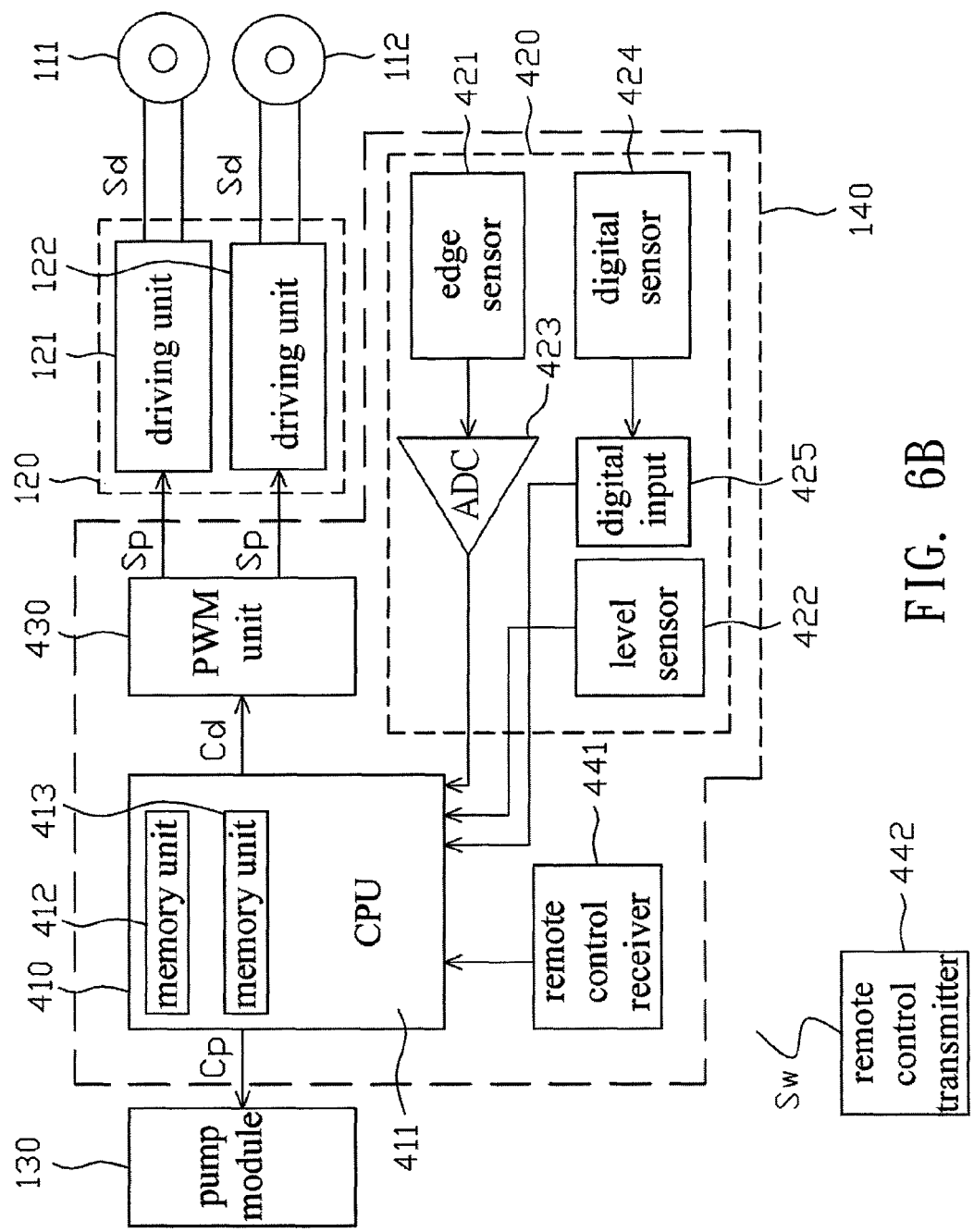
FIG. 6B is a function block diagram of a cleaner according to one embodiment of the invention.

FIG. 6B is a function block diagram of a cleaner according to one embodiment of the invention. Referring to FIG. 6B, in one embodiment, the control system 140 includes a level sensor 422. The method that the control system 140 controls the rotation angle of the linkage arm ARM is to control the feed positioning of the linkage arm ARM according to the feedback of the level sensor 422 of the cleaner. The torques T1 and T2 are withdrawn after the linkage arm ARM is situated in a target position.

Likewise, when the cleaning wheel W1 is to be moved, the active cleaning wheel W2 is caused substantially not to rotate and the cleaning wheel W1 is caused to rotate along a direction d2 so that a corresponding torque is produced between the cleaning wheel W1 and the link arm ARM. Then, the corresponding torque causes the link arm ARM to swing toward the direction d1 opposite to the direction d2 so that the cleaner moves towards a direction d3. In this embodiment, the direction d1 is clockwise and the direction d2 is counterclockwise.

In a similar manner, the cleaner can move forward or backward by controlling the magnitude and the direction of the torque T2 on the cleaning wheel W1, or the magnitude and the direction of the torque T1 on the cleaning wheel W2.

Please be noted that the number of cleaning components equal to two is utilized as an embodiment and is not limitation of the invention. In one embodiment, the cleaner may include only one cleaning component 111 and have a link arm linked between the cleaning component 111 and a fixed point to thereby achieve the purpose of cleaning a part of the plate 900. In an alternate embodiment, the cleaned component 111 is shaken to move irregularly on the plate 900 and randomly clean particles on the paths where the cleaner passes.

Referring again to FIG. 1 and FIG. 2, in one embodiment, the pump module 130 further includes two air valves 133 and 134 in addition to the vacuum pump 131. The vacuum pump 131 is connected to the space 113 via the air valve 133 and to the space 114 via the air valve 134. The control system 140 can control opening sizes of the air valves 133 and 134 to thereby control the magnitudes of the negative air pressures in the spaces 113 and 114. Besides, when the cleaning wheel W2 is to be moved, a smaller absolute value of the negative air pressure in the space 114 and a greater absolute value of the negative air pressure in the space 113 make the friction force between the cleaning wheel W2 and the plate 900 smaller and the friction force between the cleaning wheel W1 and the plate 900 larger. Therefore, the cleaning wheel W2 can move more smoothly.

Figure 4:
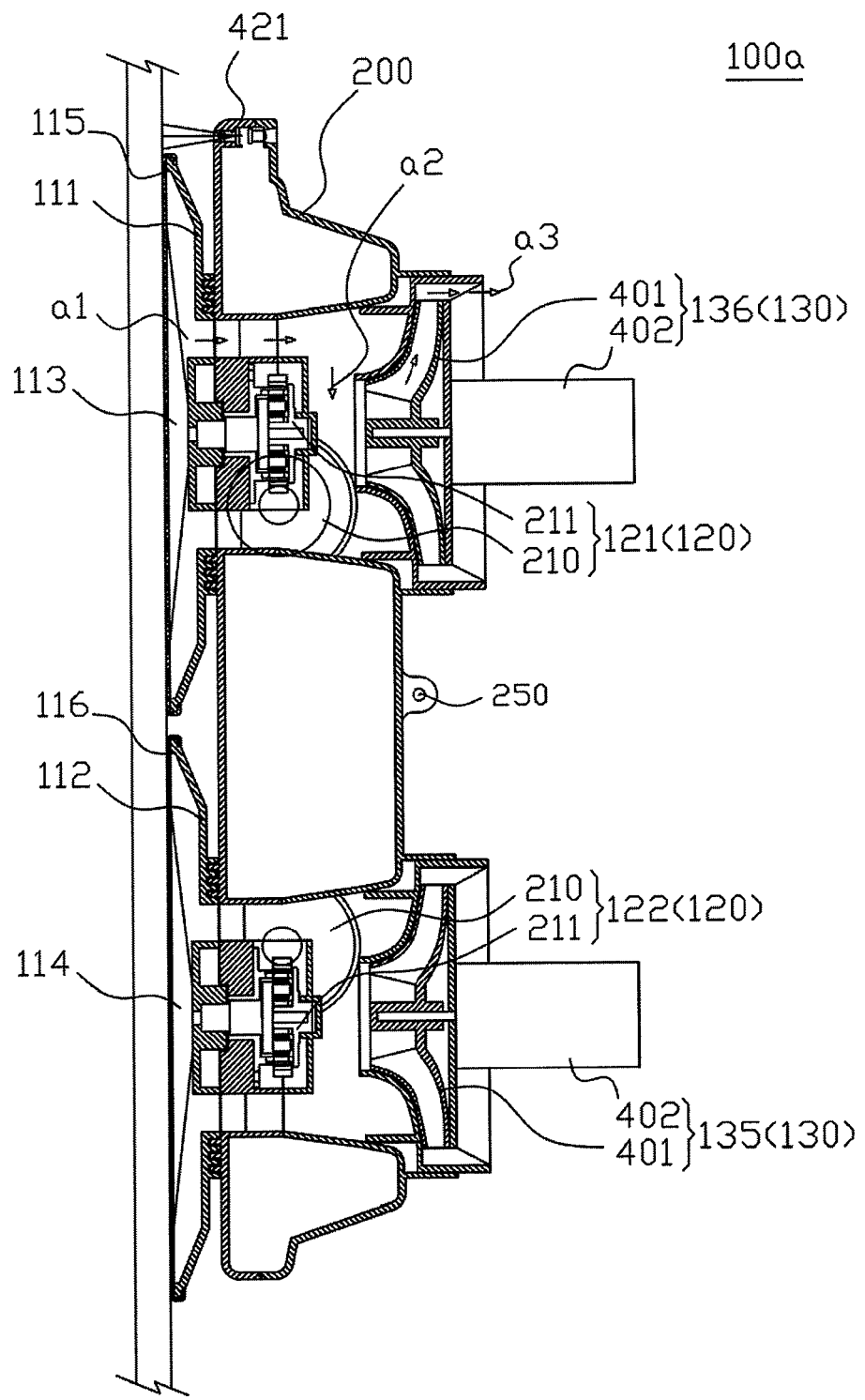
FIG. 4 is a cross-section diagram of a cleaner according to one embodiment of the invention.
Figure 5:
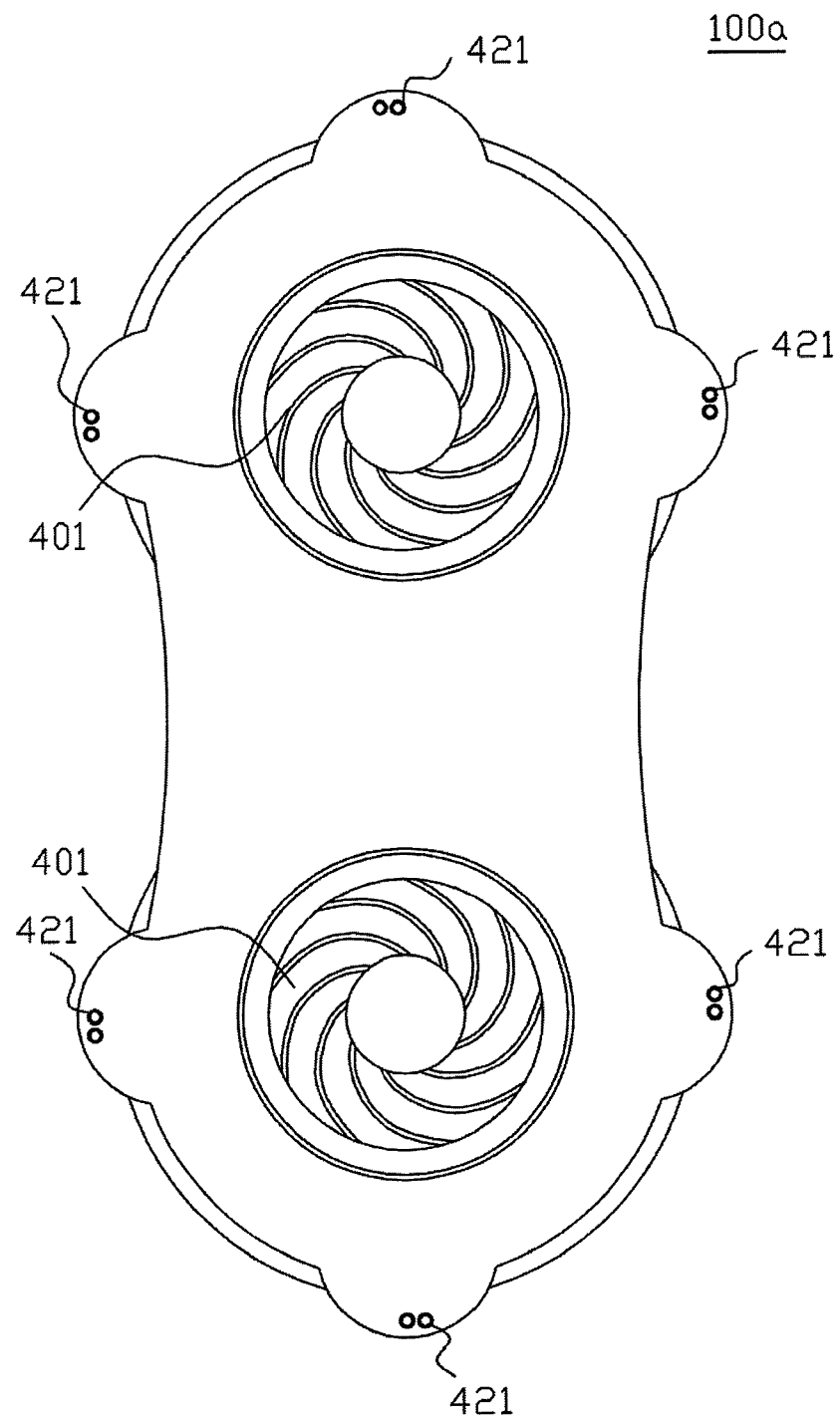
FIG. 5 is a top-view diagram of the cleaner of FIG. 4.

FIG. 4 is a cross-section diagram of a cleaner according to one embodiment of the invention. FIG. 5 is a top-view diagram of the cleaner of FIG. 4. The cleaner 100 in the embodiment of FIG. 1 is similar to a cleaner 100a in the embodiment of FIG. 4. Common reference numerals have been employed where common components have the same function and thus the related descriptions are omitted herein. Differences between the two embodiments are described as follows. As shown in FIGS. 4 and 5, in one embodiment, the pump module 130 can include two vacuum pumps 136 and 135. The vacuum pump 136 is connected to the space 113 while the vacuum pump 135 is connected to the space 114. By controlling the pumping capacities of the vacuum pumps 136 and 135, the control system 140 controls the magnitudes of the negative air pressures in the spaces 113 and 114, respectively. When the cleaning wheel W2 is to be moved, a smaller absolute value of the negative air pressure of the space 114 and a greater absolute value of the negative air pressure of the space 113 make the friction force between the cleaning wheel W2 and the plate 900 smaller and the friction force between the cleaning wheel W1 and the plate 900 larger. Therefore, the cleaning wheel W2 can move more smoothly.

Referring again to FIG. 1, in one embodiment, the cleaner 100 for cleaning a full-length window further includes a machine casing 200 and a safety lifting lug 250. The pump module 130, the driving module 120 and the control system 140 are disposed inside the machining casing 200 while the safety lifting lug 250 disposed outside the machine casing 200 is adapted to be tied with a safety rope (not shown). For example, the other end of the safety rope can be fastened at a fixed point of a building to prevent the cleaner 100 from falling.

Referring now to FIGS. 1 and 6B, the control system 140 includes a process unit 410, a sensor unit 420 and a pulse width modulation (PWM) unit 430. The process unit 410 outputs a driving control signal Cd. According to the driving control signal Cd, the pulse width modulation unit 430 further outputs a plurality of PWM signals Sp. According to the plurality of PWM signals Sp, the driving modulation 120 outputs a plurality of driving signals Sd. In this embodiment, each of the driving units 121 and 122 outputs a corresponding driving signal Sd according to its individual pulse width modulation signal Sp. Each of the cleaning components 111 and 112 rotates according to its individual driving signal Sd. The process unit 410 further outputs a pump control signal Cp. The pump module 130 drives the vacuum pump 131 according to the pump control signal Cp. In one embodiment, the negative air pressures in the spaces 113 and 114 are controlled by controlling the air valves 133 and 134.

For example, the process unit 410 includes a central processing unit (CPU) 411 and two memory units 412 and 413. The memory unit 412 can be a random access memory (RAM), and the memory unit 413 can be a read only memory (ROM). The CPU 411, RAM 412 and ROM 413 serve as a basic module for microcomputer operations and memory. Here the ROM 413 can also be a flash memory, and program codes can be stored in the ROM 413.

The sensor unit 420 can include a level sensor unit 422. The level sensor 422 is electrically connected to the CPU 411 and senses a horizontal angle of the cleaner 100. The CPU 411 adjusts a path of the cleaner 100 according to the horizontal angle. The horizontal angle is used as a reference for planning a cleaning path, for example, a linear forward movement, a backward movement or a path planning, for the cleaner 100. For example, in this embodiment, the level sensor unit 422 includes, without limitation, a gyro, a level sensor or any other devices that can sense an absolute horizontal angle of the cleaner.

In one embodiment, the control system 140 can further include a remote control receiver 441. The remote control receiver 441 receives a remote control signal Sw from the remote control transmitter 442 so that the control system 140 controls a path of the cleaner 100 according to the remote control signal Sw. The signal transmission method performed by the remote control receiver 441 and remote control transmitter 442 includes, for example, an infrared transmission or a wireless transmission. Here, the wireless transmission is, for example, ZigBee, Bluetooth, RFIO, Wi-Fi or the like.

Remote control functions of the cleaner 100 includes, for example, a system reset, an automatic reset, a complete start, an in-situ start, and a manual mode. The above remote control functions are further described as follows. The automatic reset refers to a function that the cleaner 100 automatically moves to a position, for example a middle lower part of the plate 900, convenient for a user to take off after cleaning is complete. The complete start refers to a function that the cleaner 100 cleans the plate 900 starting from the top, from left to right (or from right to left) and then from top to bottom as the cleaner 100 moves to the top of the plate 900. The in-situ start refers to a function that the cleaner 100 cleans the plate 900 starting from its original position, from left to right (or from right to left) and then from top to bottom. The manual mode includes a function of controlling in-situ cleaning operations of the cleaner 100 or controlling the up/down/left/right movement of the cleaner 100.

In one embodiment, the cleaner 100 has a function of detecting a window edge. As shown in FIGS. 2 and 6B, the sensor unit 420 can include an edge sensor 421 and an analog-to-digital converter (ADC) 423. The ADC 423 is coupled between the edge sensor 421 and the CPU 411. An edge of the plate 900 or a foreign object on the plate 900 can be detected by the edge sensor 421. The edge sensor 421 can be an analog sensor, for example an infrared sensor, a laser sensor, an ultrasonic sensor, or any other distance sensors. Furthermore, the edge sensor can be, for example, a limit switch or a proximity sensor. The control system 140 can determine a distance between the cleaner 100 and the edge of the plate 900 by receiving a sensing value of the edge sensor 421 through the ADC 423. Specifically, if the plate 900 is glass without a window frame and the sensing value is less than a low threshold value, this indicates that no sensing value obtained from the reflection of a sensing signal off the glass is received by the control system 140. That is, the cleaner 100 is currently close to the glass edge. On the other hand, if the plate 900 is glass with a window frame and the sensing value is higher than a high threshold value, this indicates the cleaner 100 is currently close to the window frame and thus the control system 140 receives a greater sensing value obtained from the reflection of a sensing signal.

Furthermore, in one embodiment, the sensor unit 420 can include a digital sensor 424 and a digital input 425. The digital sensor 424 detects the window frame by using a mechanism to touch the window edge. The digital sensor 424 is, for example, a limit switch or a proximity switch. The digital input 425 can be a button input or receive an output from the digital sensor 424.

The path controlling method of the cleaner 100 according to one embodiment of the invention is described in more detail as follows.

Figure 7:
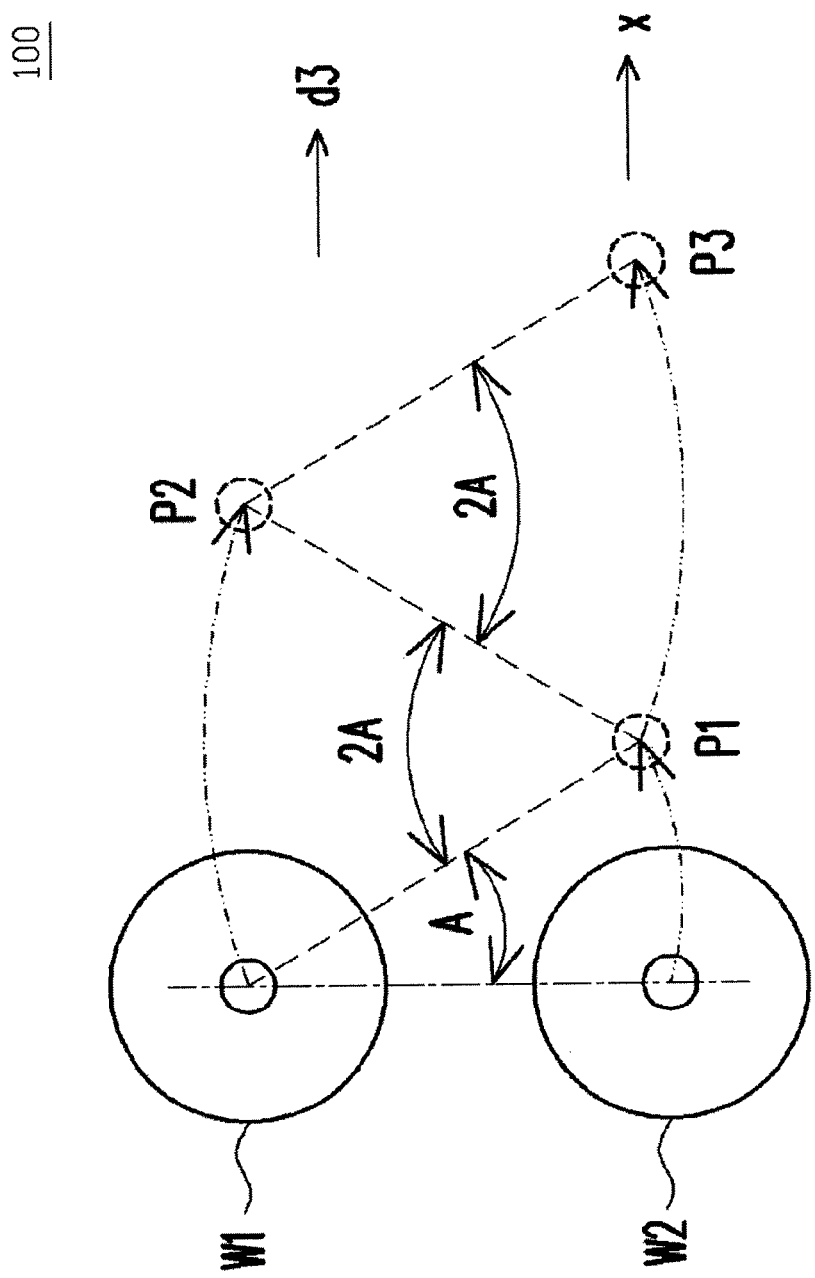
FIG. 7 is a diagram showing that a cleaner moves along one direction according to one embodiment of the invention.

FIG. 7 is a diagram showing that the cleaner 100 moves along one direction according to one embodiment of the invention. FIG. 7 is used to describe the path that the cleaner 100 moves forwards or backwards relative to a direction d3 where the direction d3 is, for example, x-axis. According to the above methods of controlling the forward or backward movement of the cleaning wheels W1 and W2, the method of controlling the linear forward movement or the linear backward movement of the cleaner 100 along a fixed direction includes the following steps. Step 7-1: swing the cleaning wheel W2 to a position P1 by using the above-mentioned method of FIG. 3 and its swing angle is A. Step 7-2: swing the cleaning wheel W1 to a position P2 and its swing angle is 2A. Step 7-3: swing the cleaning wheel W2 to a position P3 and its swing angle is 2A. Step 7-4: the cleaner 100 can make a linear forward movement along the direction d3 by repeating the last two steps (step 7-2 and step 7-3). Furthermore, the cleaner 100 can make a linear backward movement by repeating the last two steps (step 7-2 and step 7-3) in reverse order. That is, the cleaner 100 moves along a direction opposite to the direction d3.

Figure 8:
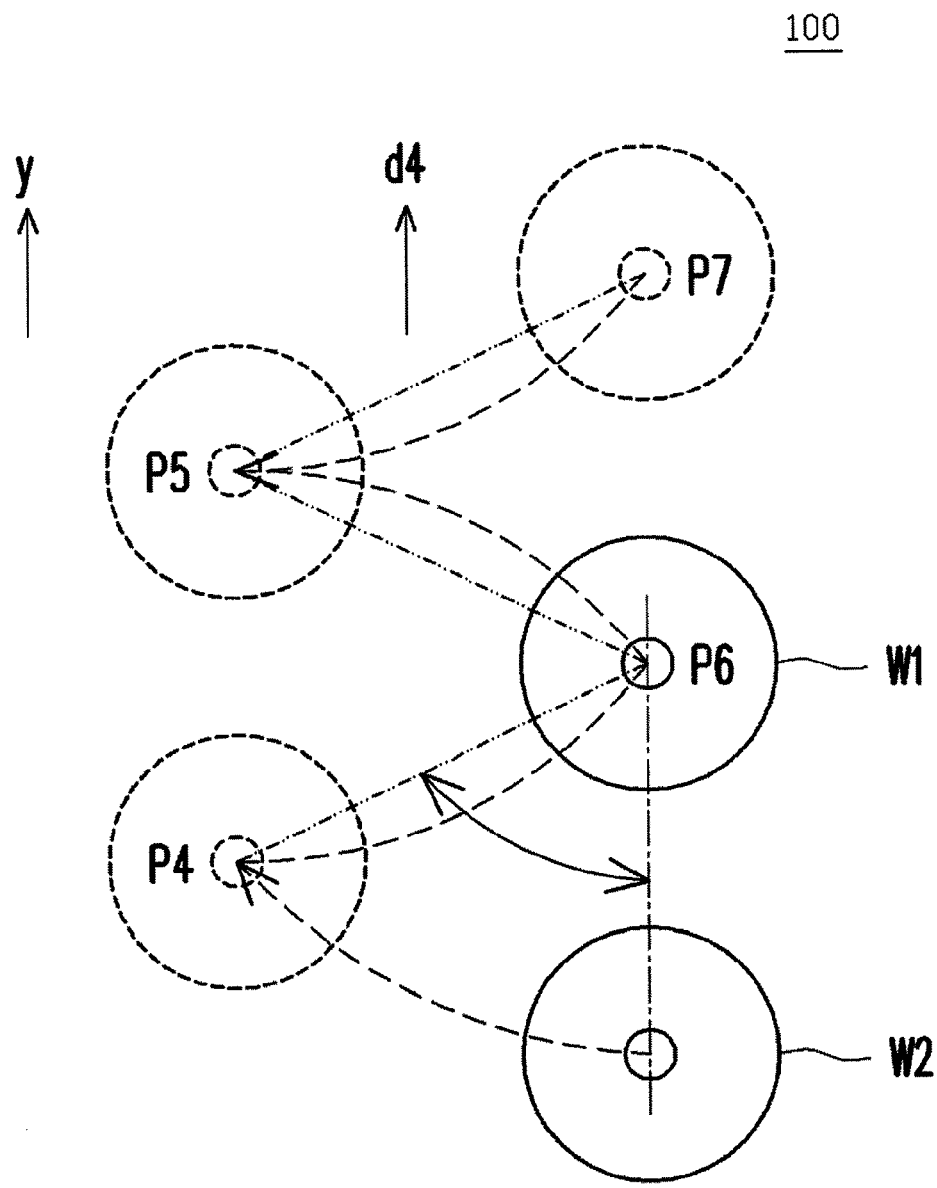
FIG. 8 is a diagram showing that a cleaner moves along another direction according to one embodiment of the invention.

FIG. 8 is a diagram showing that the cleaner 100 moves along another direction according to one embodiment of the invention. FIG. 8 is used to describe the path that the cleaner 100 moves forwards or backwards relative to a direction d4 where the direction d4 is perpendicular to the direction d3 and is, for example, y-axis. The method of controlling the linear forward movement or the backward movement of the cleaner 100 along the fixed direction d4 includes the following steps. Step 8-1: swing the cleaning wheel W2 to a position P4. Step 8-2: swing the cleaning wheel W1 to a position P5. Step 8-3: swing the cleaning wheel W2 to a position P6. Step 8-4: swing the cleaning wheel W1 to a position P7. Step 8-5: the cleaner 100 can make a linear forward movement along the direction d4 by repeating the last four steps (from Step 8-1 to Step 8-4). Furthermore, the cleaner 100 can make a linear backward movement along the direction d4 by repeating the last four steps (from Step 8-1 to Step 8-4) in reverse order. That is, the cleaner 100 moves along a direction opposite to the direction d4.

Based on the above disclosure, forming the negative air pressure spaces between the cleaner and the plate makes the cleaner sucked on the plate via the atmospheric pressure and then a cleaning component of the cleaner is driven to move so that the cleaner makes a movement on the plate. Therefore, the particles on the plate are able to be cleaned.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A cleaner for cleaning particles on a plate, comprising:
    at least one cleaning component, wherein the at least one cleaning component and the plate delimits at least one space;
    a pump module connected to the at least one space for pumping air out of the at least one space to form a negative air pressure in the at least one space so that the cleaner is sucked on the plate;
    a driving module connected to the at least one cleaning component for driving the at least one cleaning component; and
    a control system coupled to the pump module and the driving module for controlling the driving module to cause the at least one driven cleaning component to make a movement on the plate,
    wherein the at least one space comprises a first space and a second space,
    wherein the at least one cleaning component comprises:
    a first cleaning component, wherein the first cleaning component and the plate delimit the first space; and
    a second cleaning component, wherein the second cleaning component and the plate delimit the second space;
    wherein the pump module is connected to the first space and the second space to form a first negative air pressure in the first space and a second negative air pressure in the second space,
    wherein the driving module comprises a link arm connected between the first cleaning component and the second cleaning component and causes at least one of the first cleaning component and the second cleaning component to rotate, and
    wherein, in a first period of time, the driving module causes the second cleaning component to rotate along a first rotation direction to generate a first torque between the second cleaning component and the link arm so that the link arm swings toward a second rotation direction opposite to the first rotation direction by the first torque.

2. The cleaner according to claim 1, wherein the driving module causes the first cleaning component substantially not to rotate and exerts a second torque between the first cleaning component and the link arm so that the link arm swings toward the second rotation direction.

3. The cleaner according to claim 2, wherein the pump module comprises:
    a first vacuum pump connected to the first space for forming the first negative air pressure in the first space; and
    a second vacuum pump connected to the second space for forming the second negative air pressure in the second space, wherein the control system controls the first vacuum pump and the second vacuum pump to cause the first negative air pressure to be greater than the second negative air pressure.

4. The cleaner according to claim 2, wherein the pump module comprises:
    a first air valve;
    a second air valve; and
    a vacuum pump connected to the first space through the first air valve and to the second space through the second air valve,
    wherein the control system controls the first air valve and the second air valve to cause the first negative air pressure to be greater than the second negative air pressure.

5. The cleaner according to claim 2, wherein, in a second period of time, the driving module causes the first cleaning component to rotate along the second rotation direction to generate a third torque between the first cleaning component and the link arm, and the driving module causes the second cleaning component substantially not to rotate and exerts a fourth torque between the second cleaning component and the link arm so that the link arm swings toward the first rotation direction by the third torque and the fourth torque.

6. The cleaner according to claim 1, wherein the driving module further comprises:
    a first driving device connected to the first cleaning component for causing the first cleaning component to rotate; and
    a second driving device being connected to the second cleaning component for causing the second cleaning component to rotate.

7. The cleaner according to claim 1, wherein the control system comprises a level sensor for sensing a horizontal angle of the cleaner, and wherein the control system controls the driving module according to the horizontal angle.

8. The cleaner according to claim 1, further comprising:
    a machine casing; and
    a safety lifting lug disposed on the machine casing and configured to be tied with a safety rope, wherein the safety rope is used to be tied between the safety lifting lug and a fixed point.

9. The cleaner according to claim 1, further comprising:
    a machine casing; and
    at least one sensor disposed on the machine casing and electrically connected to the control system for sensing whether the cleaner is close to a foreign object or an edge of the plate.

10. The cleaner according to claim 1, further comprising:
    a battery module electrically connected to the pump module, the driving module and the control system for providing a power source.

11. The cleaner according to claim 1, wherein the control system comprises a remote control receiver for receiving a remote control signal, and wherein the control system controls the driving module according to the remote control signal.

12. A method of controlling a cleaner path, applied in a cleaner moving on a plate, the cleaner comprising a first cleaning component, a second cleaning component and a link arm, the link arm connected to the first cleaning component and the second cleaning component, the method comprising:
    forming negative air pressures in a first space and a second space, wherein the first cleaning component and the plate delimit the first space, and the second cleaning component and the plate delimit the second space; and
    causing the second cleaning component to rotate along a first rotation direction to generate a first torque between the second cleaning component and the link arm so that the link arm swings toward a second rotation direction opposite to the first rotation direction by the first torque.

13. The path controlling method according to claim 12, further comprising:
    causing the first cleaning component substantially not to rotate; and
    exerting a second torque between the first cleaning component and the link arm so that the link arm swings toward the second rotation direction.

14. The path controlling method according to claim 12, further comprising:
    causing the negative air pressure in the first space to be greater than the negative air pressure in the second space.

* * * * *